US008602358B2

United States Patent
Pladeck et al.

(10) Patent No.: US 8,602,358 B2
(45) Date of Patent: Dec. 10, 2013

(54) INTERFACE ELEMENT, AIRCRAFT INTERIOR EQUIPMENT COMPONENT AND METHOD FOR INSTALLING AN AIRCRAFT INTERIOR EQUIPMENT COMPONENT

(75) Inventors: Gerrit Pladeck, Landsberg (DE); Remigiusz Kowalski, Biberach (DE); Dietmar Ströbele, Achstetten (DE); Joerg Stuetzer, Burgrieden (DE); Stefan Knoepfle, Untermeitingen (DE)

(73) Assignee: Airbus Operations GmbH, Hamburg (DE)

( * ) Notice: Subject to any disclaimer, the term of this patent is extended or adjusted under 35 U.S.C. 154(b) by 275 days.

(21) Appl. No.: 12/999,710

(22) PCT Filed: Jun. 15, 2009

(86) PCT No.: PCT/EP2009/004278
§ 371 (c)(1),
(2), (4) Date: Mar. 15, 2011

(87) PCT Pub. No.: WO2009/153011
PCT Pub. Date: Dec. 23, 2009

(65) Prior Publication Data
US 2011/0155853 A1 Jun. 30, 2011

Related U.S. Application Data

(60) Provisional application No. 61/074,172, filed on Jun. 20, 2008.

(30) Foreign Application Priority Data

Jun. 20, 2008 (DE) .......................... 10 2008 029 468

(51) Int. Cl.
*B64C 1/06* (2006.01)

(52) U.S. Cl.
USPC ...................... 244/131; 244/118.1; 244/118.5

(58) Field of Classification Search
USPC ..................................... 244/118.1, 118.5, 131
See application file for complete search history.

(56) References Cited

U.S. PATENT DOCUMENTS

| 3,227,475 A | 1/1966 | Sinkinson |
| 4,895,425 A | 1/1990 | Iwano et al. |

(Continued)

FOREIGN PATENT DOCUMENTS

| DE | 10233127 | 12/2003 |
| DE | 102006016509 | 10/2007 |

(Continued)

OTHER PUBLICATIONS

European Patent Office, International Search Report, Dec. 16, 2009.

*Primary Examiner* — Philip J Bonzell
*Assistant Examiner* — Timothy Schwarz
(74) *Attorney, Agent, or Firm* — Wood, Herron & Evans, LLP

(57) ABSTRACT

An interface element connects a first section of an aircraft supply system, which is provided on an aircraft interior equipment component, to a second section of the aircraft supply system and includes a carrier structure which is fastenable to the aircraft interior equipment component. Further, the interface element includes a connector element which is connectable to the first section of the aircraft supply system provided on the aircraft interior equipment component and which is mounted on the carrier structure by way of a bearing device. The bearing device includes at least one resilient bearing element which enables the connector element to be mounted such that it is movable in all three spatial directions.

11 Claims, 6 Drawing Sheets

(56) References Cited

U.S. PATENT DOCUMENTS

| | | |
|---|---|---|
| 7,258,559 B2 | 8/2007 | Mattern et al. |
| 2002/0081881 A1* | 6/2002 | Komenda et al. ............. 439/247 |
| 2006/0073723 A1* | 4/2006 | Cowgill et al. ............... 439/247 |
| 2009/0221154 A1* | 9/2009 | Hartlef et al. .................. 439/39 |

FOREIGN PATENT DOCUMENTS

| | | |
|---|---|---|
| EP | 0794594 | 9/1997 |
| EP | 0901197 | 3/1999 |
| WO | 2008135449 | 11/2008 |

* cited by examiner

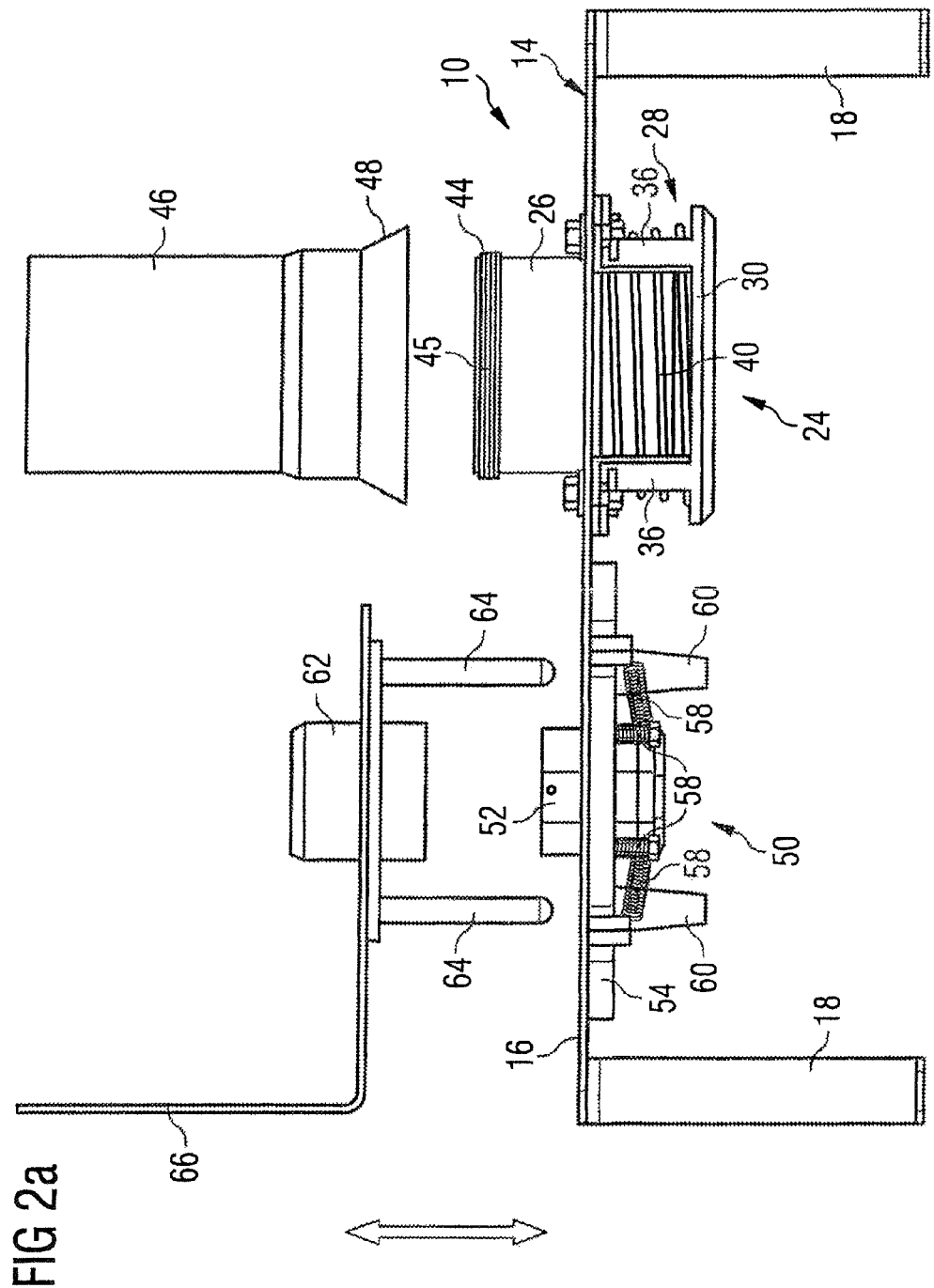

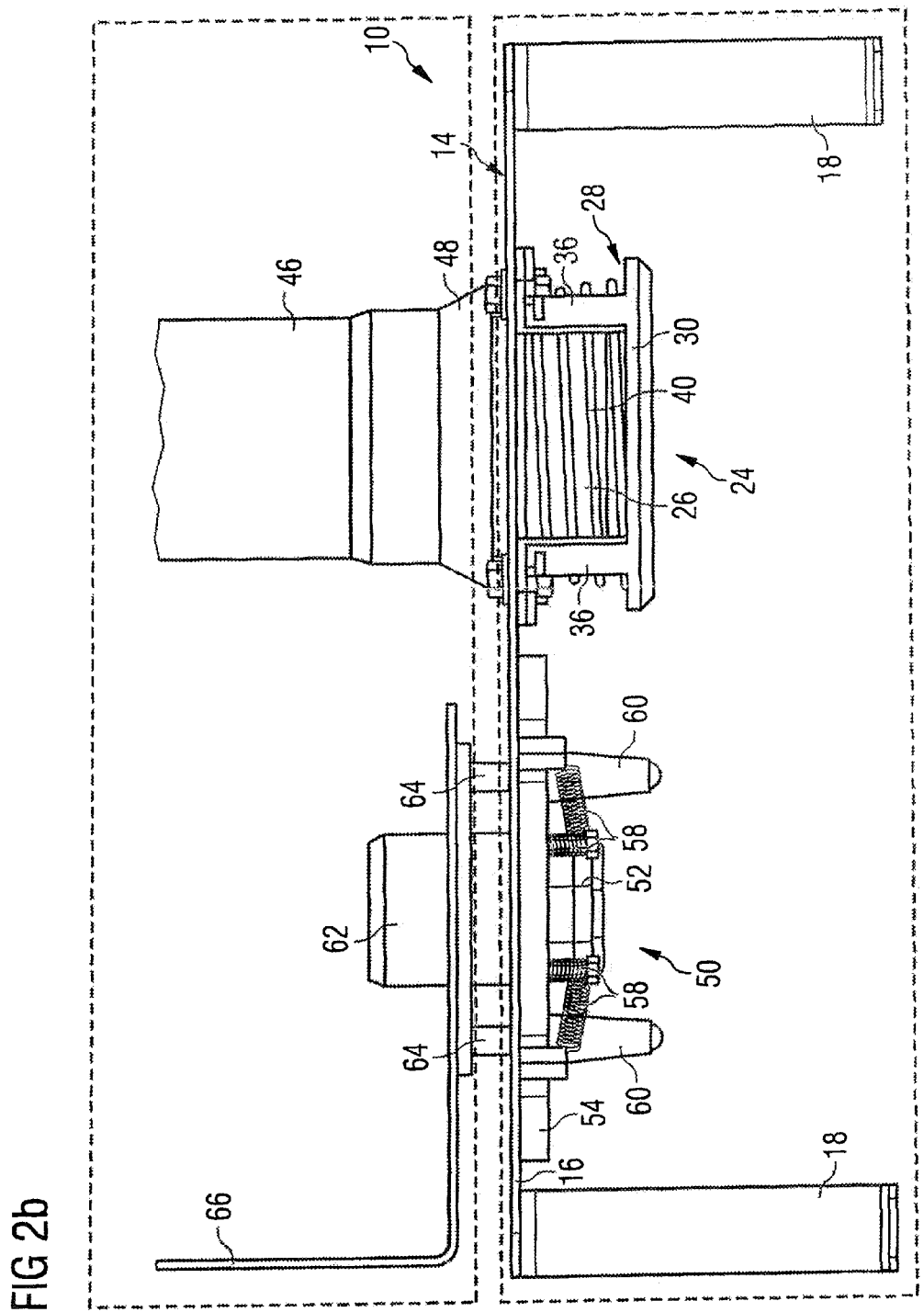

INTERFACE ELEMENT, AIRCRAFT INTERIOR EQUIPMENT COMPONENT AND METHOD FOR INSTALLING AN AIRCRAFT INTERIOR EQUIPMENT COMPONENT

This application claims priority to PCT Application No. PCT/EP2009/004278, filed on Jun. 15, 2009, under Section 371 and/or as a continuation under Section 120, which claims priority to German Application No. 10 2008 029 468.3 and U.S. Provisional Application No. 61/074,172, both filed on Jun. 20, 2008.

TECHNICAL FIELD

The invention relates to an interface element for connecting a first section of an aircraft supply system, which is provided on an aircraft interior equipment component, to a second section of the aircraft supply system, and an aircraft interior equipment component which is provided with an interface element of this kind Furthermore, the invention relates to a method for installing an aircraft interior equipment component in an aircraft.

BACKGROUND

When installing interior equipment components, for example side, ceiling and door cladding panels, luggage lockers or galley components, in an aircraft it is currently conventional to mount the interior equipment components in their desired position in the aircraft and to connect respective connectors on the components to the various aircraft supply systems only after that. For example, when a luggage locker is installed in an aircraft, first the luggage locker is secured to the aircraft structure. Then, in a separate operational step, the respective connectors provided on the luggage locker are connected to the electrical supply system, the oxygen supply system and the air supply system of the aircraft. For this reason, the final installation of the aircraft interior equipment components is very time-consuming and consequently cost-intensive. Moreover, the interior equipment components have to be shaped and positioned in the aircraft in such a way that sufficiently large areas for access to the connection points between the connectors on the components and the aircraft supply systems remain free. These access areas cannot be used as installation space for other aircraft components, or only to a limited extent.

The object of the invention is to provide an interface element for connecting a first section of an aircraft supply system, which is provided on an aircraft interior equipment component, to a second section of the aircraft supply system, an aircraft interior equipment component which is provided with an interface element of this kind, and a method for installing an aircraft interior equipment component in an aircraft, all of which enable simple and rapid installation of the interior equipment component in the aircraft.

This object is achieved by an interface element having the features described below, an aircraft interior equipment component having the features described below, and a method for installing an aircraft interior equipment component in an aircraft having the features described below.

SUMMARY OF THE INVENTION

An interface element according to the invention for connecting a first section of an aircraft supply system, which is provided on an aircraft interior equipment component, to a second section of the aircraft supply system includes a carrier structure which is fastenable to the aircraft interior equipment component. The aircraft supply system may for example be an air supply system, an electrical supply system, a water supply system, an oxygen supply system or any other supply system provided on board the aircraft. The only essential point is that the supply system includes a first section which is on the interior equipment component and which on installation of the interior equipment component in the aircraft has to be connected to a second section. The second section of the aircraft supply system may for example be a central section of the supply system on the aircraft. As an alternative to this, however, the second section of the aircraft supply system may also be an aircraft supply system section which is associated with another interior equipment component.

Further, the interface element according to the invention includes a connector element which is connectable to the first section of the aircraft supply system provided on the aircraft interior equipment component. When the interface element is installed on the aircraft interior equipment component, the connector element thus forms the interface between the first section of the aircraft supply system, on the component, and the second section of the aircraft supply system, to be connected thereto.

The connector element is mounted on the carrier structure by way of a bearing means. The bearing means includes at least one resilient bearing element which enables the connector element to be mounted such that it is movable in all three spatial directions. In other words, the bearing means of the interface element according to the invention takes a form such that the connector element is mounted on the carrier structure such that it is movable in all three spatial directions.

With the aid of the interface element according to the invention, a plug and play connection is made between the first section of the aircraft supply system, which is provided on the aircraft interior equipment component, and the second section of the aircraft supply system. For this reason, it is no longer necessary during installation first to secure the interior equipment component to the aircraft structure and to connect the first section of the aircraft supply system provided on the interior equipment component to the second section of the aircraft supply system only after that, in a separate, second operational step. Instead, the interface element enables installation of the interior equipment component and connection of the first section of the aircraft supply system provided on the interior equipment component to the second section of the aircraft supply system in one operation. During this, the design and installation tolerances are advantageously balanced out by the bearing of the connector element such that it is movable in all three spatial directions, this bearing ensuring that the connector element is automatically centred when the connector element is connected to the second section of the aircraft supply system.

By using the interface element according to the invention, it is thus possible considerably to simplify and speed up the installation in an aircraft of an interior equipment component which is equipped with the interface element according to the invention. Moreover, it is no longer necessary, when positioning the interior equipment component in the aircraft, to leave areas for access to the connectors, provided on the component, of the first section of the aircraft supply system free so that these connectors can be connected to the second section of the aircraft supply system after the interior equipment component has been secured to the aircraft structure. These access regions can therefore be advantageously dispensed with when the interface element according to the invention is used and utilised for example as the installation space for other aircraft components.

The connector element of the interface element according to the invention may be an air supply system connector element, an electrical connector element, a water supply system connector element and/or an oxygen supply system connector element. The only essential point is that the connector element can provide a properly functioning connection between the first section of the aircraft supply system, which is provided on the interior equipment component, and the second section of the aircraft supply system. Preferably, the second section of the aircraft supply system has a connector element which is complementary with the connector element, in order to enable the connector element to be connected to the second section of the aircraft supply system in a particularly simple and convenient way.

In principle, the interface element according to the invention may include only one connector element. Preferably, however, the interface element according to the invention is provided with a plurality of connector elements. For example, an air supply system connector element, an electrical connector element and an oxygen supply system connector element may be provided on a single interface element. As an alternative or in addition to this, a connector element may also take a form such that it enables the first sections of a plurality of aircraft supply systems to be connected to the corresponding second sections of these aircraft supply systems. An interface element according to the invention which includes a plurality of connector elements or one connector element which is suitable for connecting the first sections of a plurality of aircraft supply systems to the corresponding second sections of these aircraft supply systems is in particular suitable for use with an aircraft interior equipment component which is connected to a plurality of aircraft supply systems. The interface element then makes a particularly simple installation of this interior equipment component possible.

A positioning means which is set up to cooperate with a complementary positioning means, provided on the second section of the aircraft supply system, when the first section of the aircraft supply system is connected to the second section of the aircraft supply system may be constructed on the connector element and/or on the bearing means of the interface element according to the invention. When the first section of the aircraft supply system, provided on the interior equipment component, is connected to the second section of the aircraft supply system, the positioning means enables the connector element, which is mounted such that it is movable in all three spatial directions, to be aligned in optimum manner in relation to the second section of the aircraft supply system which is to be connected to the connector element.

A connection means for connecting the connector element to the second aircraft supply system may be provided on the connector element. For example, a latching means which cooperates with a complementary latching means on the second section of the aircraft supply system may be provided on the connector element in order to connect the connector element securely to the second section of the aircraft supply system.

Preferably, the carrier structure of the interface element according to the invention includes a plate which is provided with a cutout for receiving the connector element.

If the interface element according to the invention includes a plurality of connector elements, the plate of the carrier structure is preferably provided with a corresponding number of cutouts for receiving all the connector elements of the interface element according to the invention. Further, the carrier structure may include feet connected to the plate, or a plinth connected to the plate, which is/are provided for connecting the carrier structure to the aircraft interior equipment component. The essential point, however, is that the carrier structure is shaped such that it permits the connector element to be mounted such that it is movable in all three spatial directions.

The bearing means of the interface element according to the invention may include a spring cage which is for example mounted on a surface of the carrier structure plate that faces the interior equipment component when the interface element is installed on the interior equipment component. For example, the spring cage may include a plurality of arms which are secured to the plate of the carrier structure by means of suitable securing means such as screws or the like. A spring, for example a helical spring, that is arranged in the spring cage may be supported at its first end on a support means connected to the arms of the spring cage. The support means of the spring cage may for example be constructed in an annular shape. A connector element that cooperates with a bearing means of this kind preferably includes a radially outwardly projecting flange which lies on the spring arranged in the spring cage, that is to say is supported by the second end of the spring.

A bearing means having a spring cage and a spring arranged in the spring cage is particularly suitable for the bearing in a manner movable in all three spatial directions of a connector element which has a round cross section. The bearing means may thus be used particularly advantageously to bear a tubular air supply system connector element of an interface element according to the invention such that it is movable in all three spatial directions. Moreover, a bearing means which includes a spring cage and a spring arranged in the spring cage has the properties of a simple construction and low weight.

As an alternative to this, however, the bearing means may also include a housing and, arranged in the housing and carrying the connector element, a mounting. The mounting may be mounted in the housing by the resilient bearing element such that it is movable in all three spatial directions. In other words, with a bearing means which is constructed in this way it is not the connector element itself which is directly mounted such that it is movable in all three spatial directions, but rather the mounting that carries the connector element. A bearing means of this kind is particularly suitable for bearing an electrical connector element or a connector element that serves to connect the first sections of a plurality of aircraft supply systems to the corresponding second sections of the aircraft supply systems. Moreover, a bearing means of this kind may also serve to bear a plurality of connector elements on the carrier structure of the interface element according to the invention such that they are movable in all three spatial directions. To put this into effect, all that needs to be done is to construct the mounting in an appropriate fashion to enable a plurality of connector elements to be received.

With a bearing means which includes a housing and, arranged in the housing and carrying the connector element, a mounting, the resilient bearing element may include an elastomer element arranged in the housing. As an alternative or in addition to this, the resilient bearing element may also include a plurality of springs whereof the first ends are connected to the housing and whereof the second ends are connected to the mounting carrying the connector element. Since both the elastomer element arranged in the housing and the springs make it possible to bear the housing and hence the connector element in the housing of the bearing means such that they are movable in all three spatial directions, the final design of the resilient bearing element may advantageously be adapted to the requirements made of the bearing means in respect of installation space, weight, etc. However, an elastomer element which is entirely received inside the housing is particularly well protected from environmental influences.

The mounting of the bearing means that carries the connector element may include at least one receiving means for receiving a projection constructed on the second section of the aircraft supply system. The receiving means thus forms a positioning means, while the projection constructed on the second section of the aircraft supply system forms the positioning means which complements the positioning means of the bearing means. The receiving means and/or the projection may be constructed to be conical and hence, when an aircraft interior equipment component equipped with the interface element according to the invention is installed in its position in the aircraft, enable the connector element to be aligned in a particularly simple manner.

An aircraft interior equipment component according to the invention includes an interface element as described above.

A method according to the invention for installing an aircraft interior equipment component in an aircraft includes the steps of providing an aircraft interior equipment component according to the invention, securing the aircraft interior equipment component to an aircraft structure and connecting a first section of an aircraft supply system, provided on the aircraft interior equipment component, to a second section of the aircraft supply system by connecting the connector element of the interface element to the second section of the aircraft supply system.

Preferably, with the installation method according to the invention, when the connector element of the interface element is connected to the second section of the aircraft supply system, a positioning means which is constructed on the connector element and/or the bearing means cooperates with a complementary positioning means provided on the second section of the aircraft supply system.

Further, the connector element may be connected to the second section of the aircraft supply system by means of a connection means provided on the connector element.

BRIEF DESCRIPTION OF THE DRAWINGS

A preferred embodiment of the invention will now be described in more detail with reference to the attached schematic drawings, in which:

FIGS. 2a and 2b show the connection of the interface element according to FIG. 1 to the corresponding second sections of the aircraft supply systems.

DETAILED DESCRIPTION

Figure 1:
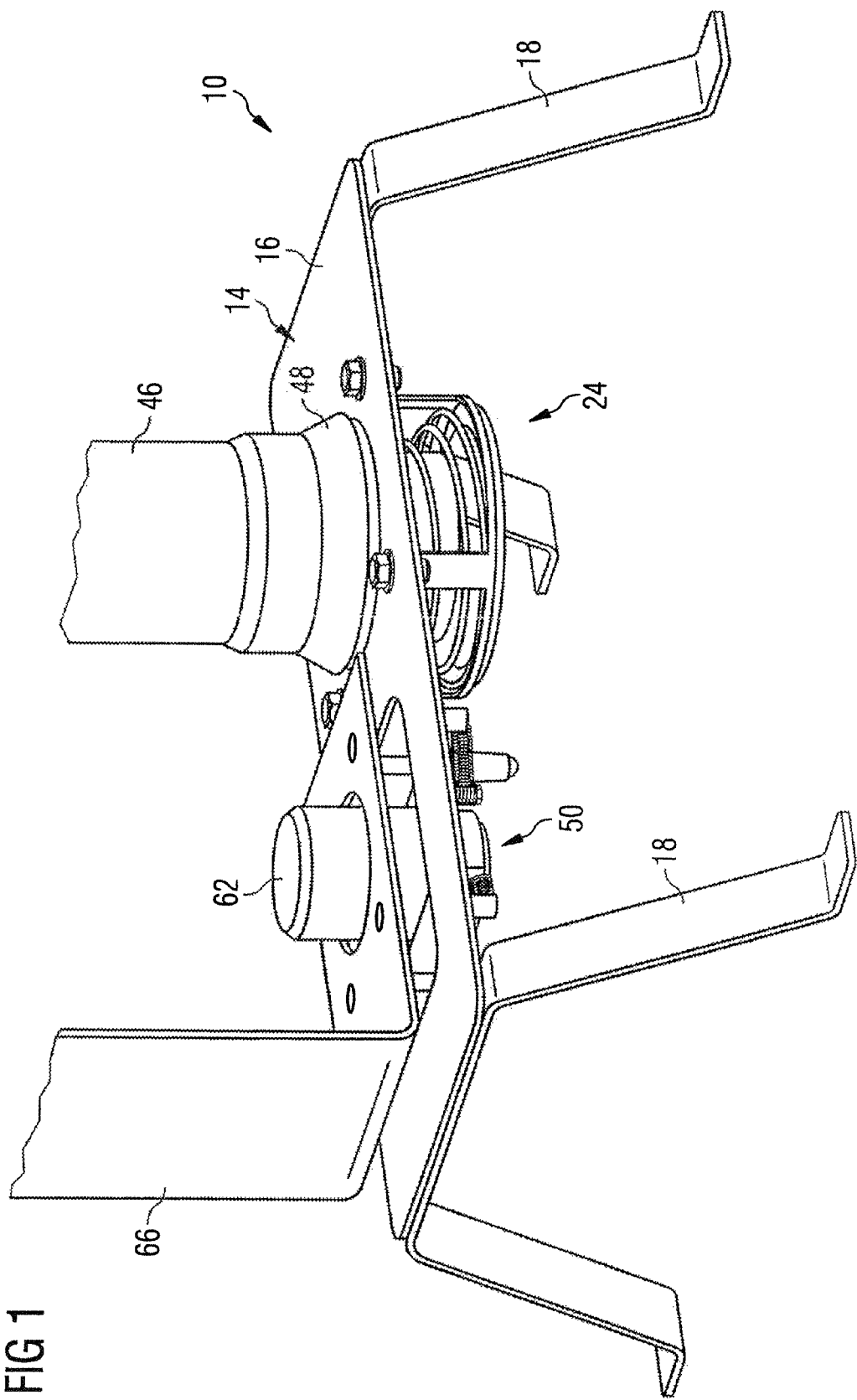
FIG. 1 shows a three-dimensional view of an interface element for connecting first sections, provided on an aircraft interior equipment component, of a plurality of aircraft supply systems to corresponding second sections of the aircraft supply systems.
Figure 3:
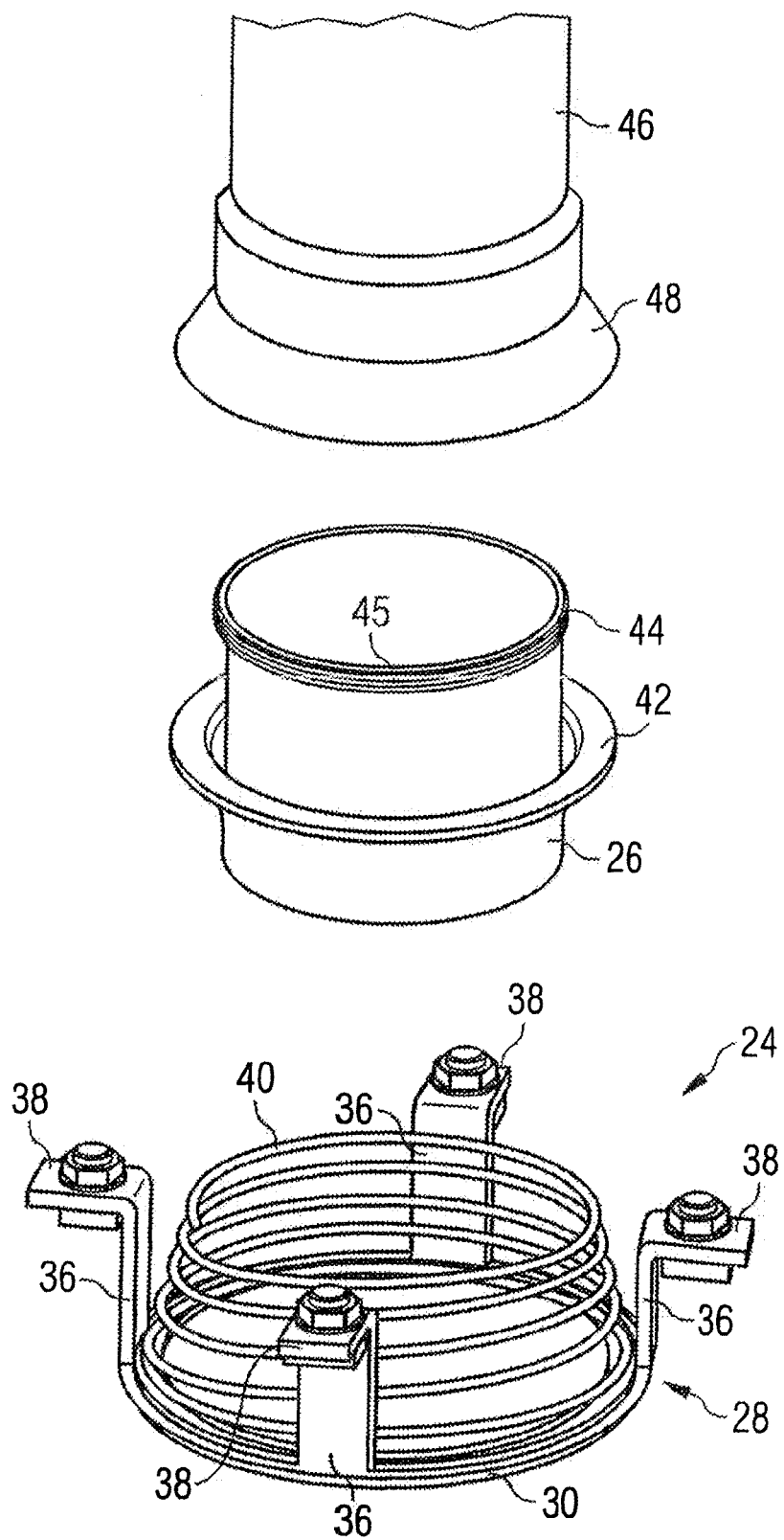
FIG. 3 shows an exploded view of a first bearing means and a first connector element of the interface element according to FIG. 1, and a part of a second section of a first aircraft supply system, provided to cooperate with the first connector element.
Figure 4:
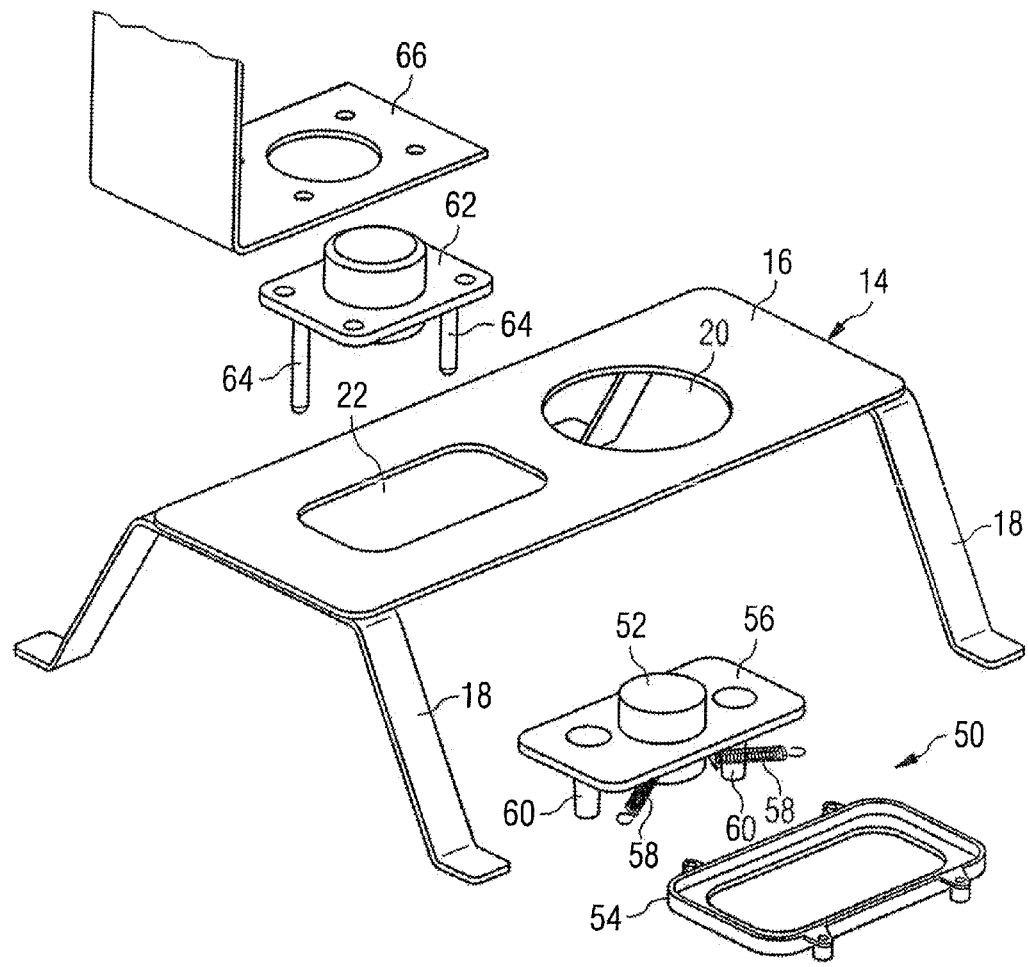
FIG. 4 shows an exploded view of a second bearing means and a second connector element of an interface element according to FIG. 1, and a part of a second section of second aircraft supply system, provided to cooperate with the second connector element.
Figure 5:
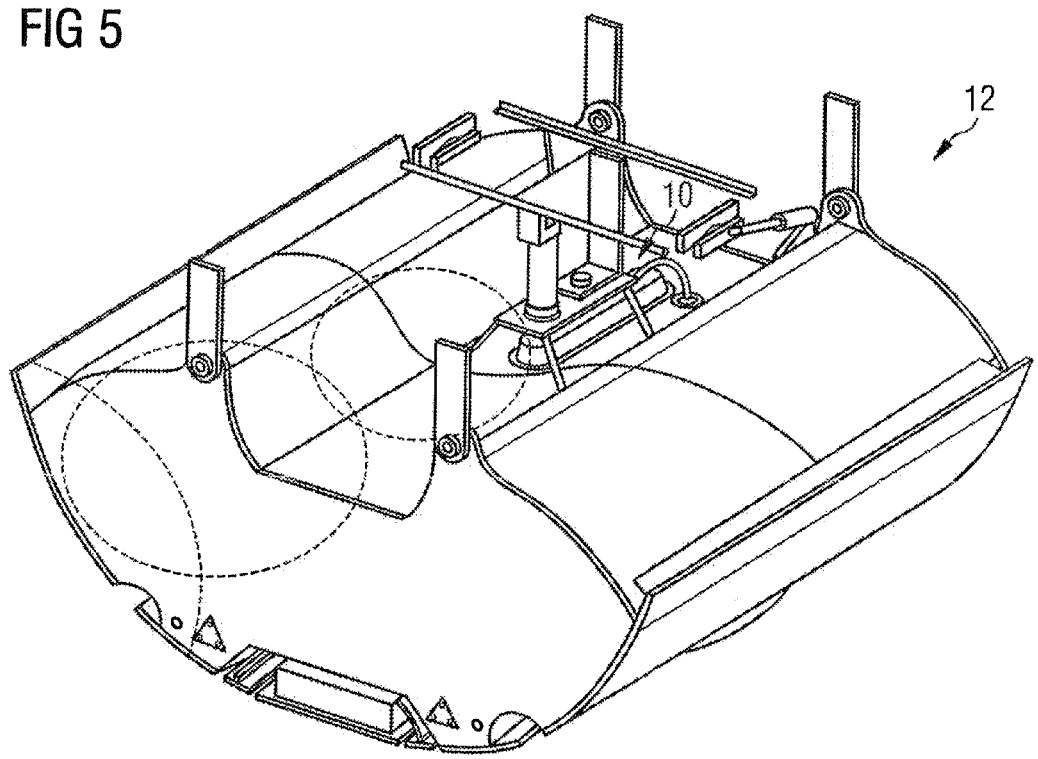
FIG. 5 shows an aircraft luggage locker equipped with an interface element according to FIG. 1.

An interface element 10 shown in FIGS. 1 to 5 serves, in an aircraft, to make a connection between first sections of a plurality of aircraft supply systems which are provided on an aircraft interior equipment component and corresponding second sections of the aircraft supply systems. As shown in FIG. 5, an aircraft interior equipment component to be equipped with the interface element 10 may for example be an overhead luggage locker 12 to be arranged in the passenger cabin of an aircraft. However, the interface element 10 may also be used with other aircraft interior equipment components, such as side, ceiling or door cladding panels, galley components or similar interior components.

The interface element 10 includes a carrier structure 14 having a plate 16 and feet 18 which carry the plate 16. The carrier structure 14 is fastenable to the aircraft interior equipment component, such as the luggage locker 12, through the feet 18. As can be seen in particular from FIG. 4, the plate 16 of the carrier structure 14 is provided with a substantially circular first cutout 20 and a substantially rectangular second cutout 22.

The interface element 10 includes a first bearing device 24, which serves to bear a first connector element 26, constructed in the form of an air supply system connector element, on the carrier structure 14 such that it is movable in all three spatial directions. As can be seen in particular from FIG. 3, the first bearing device 24 includes a spring cage 28 having an annular support device 30. From the support device 30 there extend in the peripheral direction four arms 36 which each have a radially outwardly projecting flange section 38. The spring cage 28 is screwed to the plate 16 of the carrier structure 14 by way of the flange sections 38 of the arms 36, such that the spring cage 28 extends from a surface of the carrier structure plate 16 that faces the luggage locker 12 when the interface element 10 is installed on the luggage locker 12.

Arranged in the spring cage 28 is a spring 40 constructed in the form of a helical spring. A first end of the spring 40 is supported against the support device 30 of the spring cage 28. The first connector element 26, provided to cooperate with the first bearing device 24, is constructed to be substantially tubular and, when the interface element 10 is installed on the luggage locker 12, is connected to a first section of the air supply system, provided on the luggage locker. A radially outwardly projecting flange 42 is constructed on the first connector element 26 and lies on the spring 40 arranged in the spring cage 28, that is to say is supported by a second end of the spring 40 received in the spring cage 28.

As can be seen in particular from FIG. 2b, the first connector element 26 extends through the first cutout 20 made in the carrier structure plate 16, an internal diameter of the first cutout 20 being greater than an external diameter of the first connector element 26. The first connector element 26 is thus mounted on the carrier structure 14 such that it is movable in all three spatial directions.

The first connector element 26 has an upper edge 44 which is substantially in the shape of a circular cylinder. As an alternative to this, the upper edge 44 of the first connector element 26 could also have a conically inwardly inclined shape. When the first connector element 26 is connected to a part 46 of a second section of the air supply system, provided on the aircraft, the upper edge 44 of the first connector element 26 cooperates with a conical section 48 of the part 46 of the second aircraft air supply system section. The upper edge 44 of the first connector element 26 and the conical section 48 of the part 46 of the second aircraft air supply system section thus form mutually complementary positioning means.

Moreover, the first connector element 26 includes a seal 45, which is arranged in the region of the upper edge 44 of the first connector element 26. The seal 45 ensures a sealed connection between the first connector element 26 and the part 46 of the second section of the air supply system provided on the aircraft.

The interface element 10 further includes a second bearing device 50 which serves to bear a second connector element 52 on the carrier structure 14 such that it is movable in all three spatial directions. The second connector element 52 is constructed as a combined electrical connector element and oxygen supply system connector element, and when the interface element 10 is installed on the luggage locker 12 the second connector element 52 is consequently connected to both a first section of an electrical supply system provided on the luggage locker and a first section of an oxygen supply system provided on the luggage locker.

As can be seen in particular from FIG. 4, the second bearing device 50 includes a housing 54 which, in a manner similar to the spring cage 28 of the first bearing device 24, is secured to a surface of the carrier structure plate 16 that faces the luggage locker 12 when the interface element 10 is installed on the luggage locker 12. Further, the second bearing device 50 includes a mounting 56 which is arranged in the housing 54 and carries the second connector element 54. As a result of a plurality of springs 58 whereof the first ends are connected to the housing 54 and whereof the second ends are connected to the mounting 56, the mounting 56 and hence the second connector element 52 carried by the mounting 56 are mounted in the housing 54 such that they are movable in all three spatial directions. Instead of the springs 58, the second bearing device 50 may also include an elastomer element is which is received in the housing 54 and enables the mounting 56 and hence the second connector element 52 to be mounted in the housing 54 such that they are movable in all three spatial directions.

The mounting 56 carrying the second connector element 52 further includes two receiving devices 60 which are in the form of hollow cones. When the second connector element 52 is connected to a part 62 of a second section of the electrical supply system and the oxygen supply system provided on the aircraft, the receiving device 60 serve to cooperate with projections 64 which are constructed on the part 62 of the second section of the electrical supply system and the oxygen supply system. The receiving device 60 constructed on the mounting 56 of the second bearing device 50 and the projections constructed on the part 62 of the second section of the electrical supply system and the oxygen supply system, provided on the aircraft, thus serve as mutually complementary positioning means.

When the luggage locker 12 is installed in an aircraft, the luggage locker 12 is secured to the aircraft structure by means of suitable securing device. At the same time, that is to say in the same operational step, by means of the interface element 10, a plug and play connection is made between the first sections of the air supply system, the electrical supply system and the oxygen supply system, provided on the luggage locker, and the second sections of these aircraft supply systems, provided on the aircraft. To this end, the interface element 10 secured to the luggage locker 12 is brought into proximity with the parts 46, 62 of the second section of the air supply system, the electrical supply system and the oxygen supply system of the aircraft which are to be connected to the first connector element 26 and the second connector element 52.

As soon as the upper edge 44 of the first connector element 26, which acts as a positioning device, comes into contact with the conical section 48 of the part 46 of the second air supply section, because of the bearing of the first connector element 26 on the carrier structure 14, which is movable in all three spatial directions, the first connector element 26 is automatically centred in relation to the part 46 of the second air supply system section.

Similarly, the receiving device 60 constructed on the mounting 56 of the second bearing device 50 cooperate with the projections 64 that are constructed on the part 62 of the second section of the electrical supply system and the oxygen supply is system. Because of the bearing of the mounting 56 and hence of the second connector element 52 in the housing 54, which is movable in all three spatial directions, the second connector element 52 is automatically centred in relation to the part 62, fixedly connected to a structure holder 66, of the second section of the electrical supply system and the oxygen supply system, until a connection is made between the second connector element 52 and the part 62 of the second section of the electrical supply system and indeed the oxygen supply system.

The invention claimed is:

1. An aircraft interior equipment component having an interface element for connecting first sections of a plurality of aircraft supply systems, which are provided on the aircraft interior equipment component, to corresponding second sections of the aircraft supply systems, the interface element comprising:
   a carrier structure which is fastenable to the aircraft interior equipment component and includes a plate and feet which carry the plate, the plate being provided with a plurality of cutouts, and the feet that carry the plate being set up to secure the carrier structure on the aircraft interior equipment component such that the plate is arranged at a distance from the aircraft interior equipment component, and
   a plurality of connector elements each of which is connectable to a first section of an aircraft supply system provided on the aircraft interior equipment component and each of which is mounted on the carrier structure by way of a bearing device which is secured to the plate of the carrier structure such that each connector element passes through a cutout constructed in the plate of the carrier structure, each bearing device including at least one resilient bearing element which enables the connector element associated therewith to be mounted such that the associated connector element is movable in all three spatial directions.

2. An aircraft interior equipment component according to claim 1, wherein the connector elements include at least one of an air supply system connector element, an electrical connector element, a water supply system connector element and an oxygen supply system connector element.

3. An aircraft interior equipment component according to claim 1, wherein at least one of a positioning device and a seal, which are set up to co-operate with a complementary device provided on the second section of the aircraft supply system, when a first section of the aircraft supply system is connected to a second section of the aircraft supply system, are constructed on at least one of the connector element and the bearing device.

4. An aircraft interior equipment component according to claim 1, wherein a connection device for connecting the connector element to a second section of an aircraft supply system is provided on a connector element.

5. An aircraft interior equipment component according to claim 1, wherein the a bearing device includes a spring cage and a spring that is arranged in the spring cage, and in that a radially outwardly projecting flange, which lies on the spring arranged in the spring cage, is constructed on a connector element.

6. An aircraft interior equipment component according to claim 1, wherein the bearing device includes a housing and, arranged in the housing and carrying a connector element, a mounting, the mounting being mounted in the housing by the resilient bearing element such that it is movable in all three spatial directions.

7. An aircraft interior equipment component according to claim 6, wherein the resilient bearing element includes at least one of an elastomer element arranged in the housing and a plurality of springs whereof first ends of the plurality of springs are connected to the housing and whereof second ends of the plurality of springs are connected to the mounting carrying the connector element.

8. An aircraft interior equipment component according to claim 6, wherein the mounting that carries the connector element includes at least one receiving device for receiving a projection constructed on the second section of the aircraft supply system, with at least one of the receiving device and the projection being constructed to be conical.

9. A method for installing an aircraft interior equipment component in an aircraft, having the steps of:

providing an aircraft interior equipment component according to claim 1, securing the aircraft interior equipment component to an aircraft structure, and connecting first sections of a plurality of aircraft supply systems, provided on the aircraft interior equipment component, to corresponding second sections of the aircraft supply systems by connecting the connector elements of the interface element to the second sections of the aircraft supply systems.

10. A method according to claim 9, wherein when a connector element of the interface element is connected to a second section of an aircraft supply system, a positioning device, which is constructed on at least one of the connector element and the bearing device, cooperates with a complementary positioning device provided on the second section of the aircraft supply system.

11. A method according to claim 9, wherein the connector element is connected to a second section of an aircraft supply system by a connection device provided on the connector element.

* * * * *